May 9, 1950 D. W. NELSON 2,507,454
FISHING LURE
Filed Aug. 28, 1945

DUDLEY W. NELSON
INVENTOR.

BY James A. Givnan
ATT'Y

Patented May 9, 1950

2,507,454

UNITED STATES PATENT OFFICE 2,507,454

FISHING LURE

Dudley W. Nelson, Milwaukie, Oreg.

Application August 28, 1945, Serial No. 613,067

1 Claim. (Cl. 43—42.44)

This invention relates to improvements in artificial fishing lures and has for one of its principal objects the provision of a trolling spoon which is freely swingable about a fishhook, provided with means near its trailing end to set up a drag to stabilize the hook against the rocking or spinning motion of the spoon.

A further object is the provision of a lure of this character wherein the point of the hook is always disposed above the top surface of the lure so that it is protected by the body of the lure from snagging on rocks, sunken logs and other submerged obstacles as it is being drawn over them.

A still further object is the provision of a spoon of this character which will function efficiently throughout a wider operative range than lures now common in the art.

The foregoing and other objects will be apparent as my invention is more fully hereinafter described in the following specification, illustrated in the accompanying drawing, and finally pointed out in the appended claim.

Figure 1:
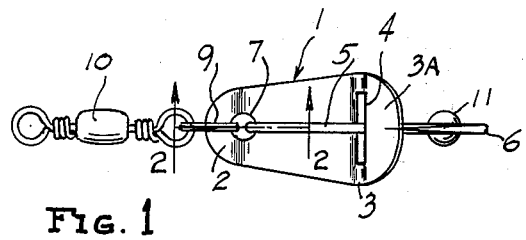
Figure 1 is a top plan view of a trolling spoon made in accordance with my invention.
Figure 2:
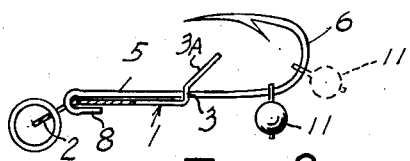
Figure 2 is a side elevation of Figure 1 with the swivel removed, and a part in section as viewed along the line 2—2 in Figure 1.

Referring now more particularly to the drawing:

Reference numeral 1 indicates the body of the spoon which is turned downwardly, as at 2, at its forward end, upwardly, as at 3, and then rearwardly, as at 3A, at its trailing end. The upturned portion 3 is purposely provided for the formation of an elongated transverse slot 4 of minimum width to slidably embrace the shank 5 of a hook 6. The forward end of the shank 5 extends through an aperture 7 in the forward end of the spoon and is turned back on itself, as at 8, for attachment to the spoon and also to allow the spoon to rock from side to side within the limits shown in broken and dotted lines in Figure 3. To the forward end of the spoon by means of the aperture 7 and a split ring 9, I attach any approved form of swivel 10 for attachment to the end of a trolling line, not shown. To the trailing end of the hook 6, I swingably and slidably attach a colored weight 11, which may be a glass bead, or the like, to represent natural bait such as salmon eggs, etc. This weight, besides adding to the attractiveness of the lure, has for its principal object the provision of a drag to maintain the hook in an upright position, as shown in Figure 2, and to maintain it in alignment with the fishing line so that the spoon may freely oscillate in the various directions shown. When the lure is in forward motion, the weight slides into approximately the position shown in dotted lines in Figure 2. It is to be understood, of course, that the hook may be loaded with any desired type of live or artificial bait to hold it steady as aforesaid.

Figure 3:
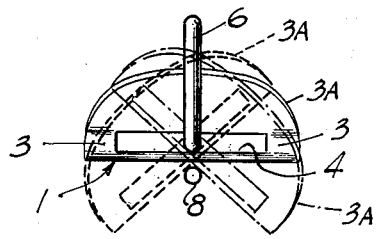
Figure 3 is an enlarged rear elevation of Figure 2 to illustrate the operative range of the spoon.
Figure 5:
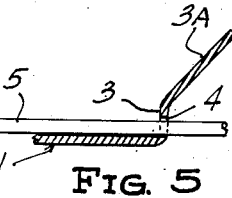
Figure 5 is a sectional side elevation taken approximately along the line 5—5 of Figure 1.
Figure 4:
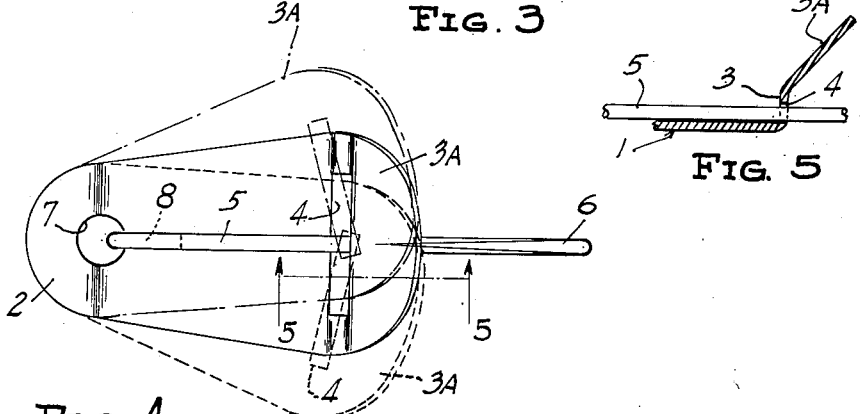
Figure 4 is an enlarged top plan view of Figure 2 illustrating further action of the spoon when viewed from above or below as it is drawn through the water.

The backwardly turned portion 8 of the forward end of the hook shank serves as a limit stop for the rocking motion of the spoon, as shown in Figure 3, while the ends of the slot 4 form limit stops for the lateral swinging and rocking motion of the spoon, as shown in Figure 4.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

In a fishing lure, the combination of a trolling spoon consisting of an elongated body member turned downwardly at its forward end and upwardly and rearwardly at its trailing end, said body member having an aperture in said forward end for attachment to a fishing line, and having an elongated transverse slot in said upwardly turned portion, and a fish hook having its shank extending through said slot and folded over on itself at its forward end for loose engagement with said aperture, whereby the body member is allowed freedom of rocking and swinging movement relative to the hook as the lure is drawn forwardly through the water.

DUDLEY W. NELSON.

REFERENCES CITED

The following references are of record in the file of this patent:

UNITED STATES PATENTS

| Number | Name | Date |
|---|---|---|
| 616,924 | Heberling | Jan. 3, 1899 |
| 1,731,161 | Farley | Oct. 8, 1929 |
| 1,977,003 | Maynard | Oct. 16, 1934 |
| 1,987,839 | Moilanen | Jan. 15, 1935 |
| 2,168,476 | Hartung | Aug. 8, 1939 |
| 2,206,486 | Nelson | July 2, 1940 |